United States Patent
Yang

(10) Patent No.: US 9,086,744 B2
(45) Date of Patent: Jul. 21, 2015

(54) COMPUTER MOUSE WITH DUST-PROOF BLOCK

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Gang Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 89 days.

(21) Appl. No.: 14/055,888

(22) Filed: Oct. 17, 2013

(65) Prior Publication Data
US 2015/0029102 A1 Jan. 29, 2015

(30) Foreign Application Priority Data

Jul. 25, 2013 (CN) .......................... 2013 1 03146015

(51) Int. Cl.
*G06F 3/033* (2013.01)
*G06F 3/0354* (2013.01)

(52) U.S. Cl.
CPC .................................. *G06F 3/03543* (2013.01)

(58) Field of Classification Search
USPC .................. 345/163, 156, 157, 158, 166, 169
See application file for complete search history.

(56) References Cited

U.S. PATENT DOCUMENTS

| | | | |
|---|---|---|---|
| 7,205,977 B2 * | 4/2007 | Ledbetter et al. | 345/156 |
| 2003/0025673 A1 * | 2/2003 | Ledbetter et al. | 345/163 |
| 2003/0090464 A1 * | 5/2003 | Lai et al. | 345/163 |
| 2005/0001816 A1 * | 1/2005 | Thompson et al. | 345/163 |
| 2005/0179660 A1 * | 8/2005 | Ledbetter et al. | 345/163 |
| 2006/0164393 A1 * | 7/2006 | Wu et al. | 345/163 |
| 2007/0296700 A1 * | 12/2007 | Lane | 345/166 |
| 2011/0074684 A1 * | 3/2011 | Abraham et al. | 345/166 |
| 2013/0194183 A1 * | 8/2013 | Odgers | 345/158 |
| 2013/0215033 A1 * | 8/2013 | Kehlstadt et al. | 345/163 |

* cited by examiner

*Primary Examiner* — Thuy Pardo
(74) *Attorney, Agent, or Firm* — Novak Druce Connolly Bove + Quigg LLP

(57) ABSTRACT

An exemplary computer mouse which is proofed against the ingress of contaminants includes a housing, a bottom cover, a left button, a right button and a middle button bracket. The middle button bracket includes a dust-proof block and a number of elastic components. The dust-proof block includes a raised portion. A middle button hole is defined between the left button and the right button, the raised portion is received in the middle button hole, and a sidewall of the raised portion is contact with or abuts a sidewall of the middle button hole. The number of the elastic components are arranged between the dust-proof block and the bottom cover. The elastic components keep a top surface of the raised portion substantially flush with outer surfaces of the left and right buttons when no button is pressed and flush with the outer surface of the button which is pressed.

12 Claims, 5 Drawing Sheets

COMPUTER MOUSE WITH DUST-PROOF BLOCK

BACKGROUND

1. Technical Field

Embodiments of the present disclosure relate to computer mice, and particularly to a computer mouse with a dust-proof structure.

2. Description of Related Art

In a typical computer mouse, a bracket of a middle button is fixed on a bottom cover of the computer mouse. When the left button or the right button is pressed by a user, a large gap is created between the left/right button and the middle button, and sweat on the user's hand and dirt may get into the computer mouse and affect the working and sensitivity of the computer mouse.

DETAILED DESCRIPTION

Figure 1:
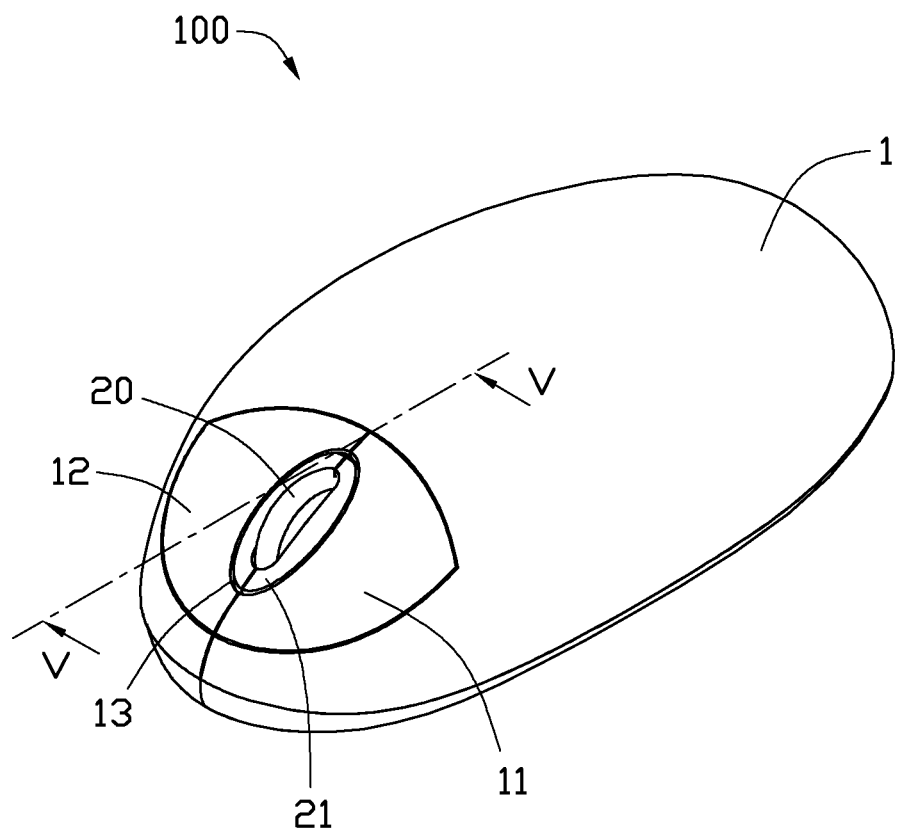
FIG. 1 is a schematic, isometric view of a computer mouse according to one embodiment of the present invention.

The disclosure, including the accompanying drawings in which like reference numerals indicate similar elements, is illustrated by way of example and not by way of limitation. It should be noted that references to "an" or "one" embodiment in this disclosure are not necessarily to the same embodiment, and such references can mean "at least one."

Figure 2:
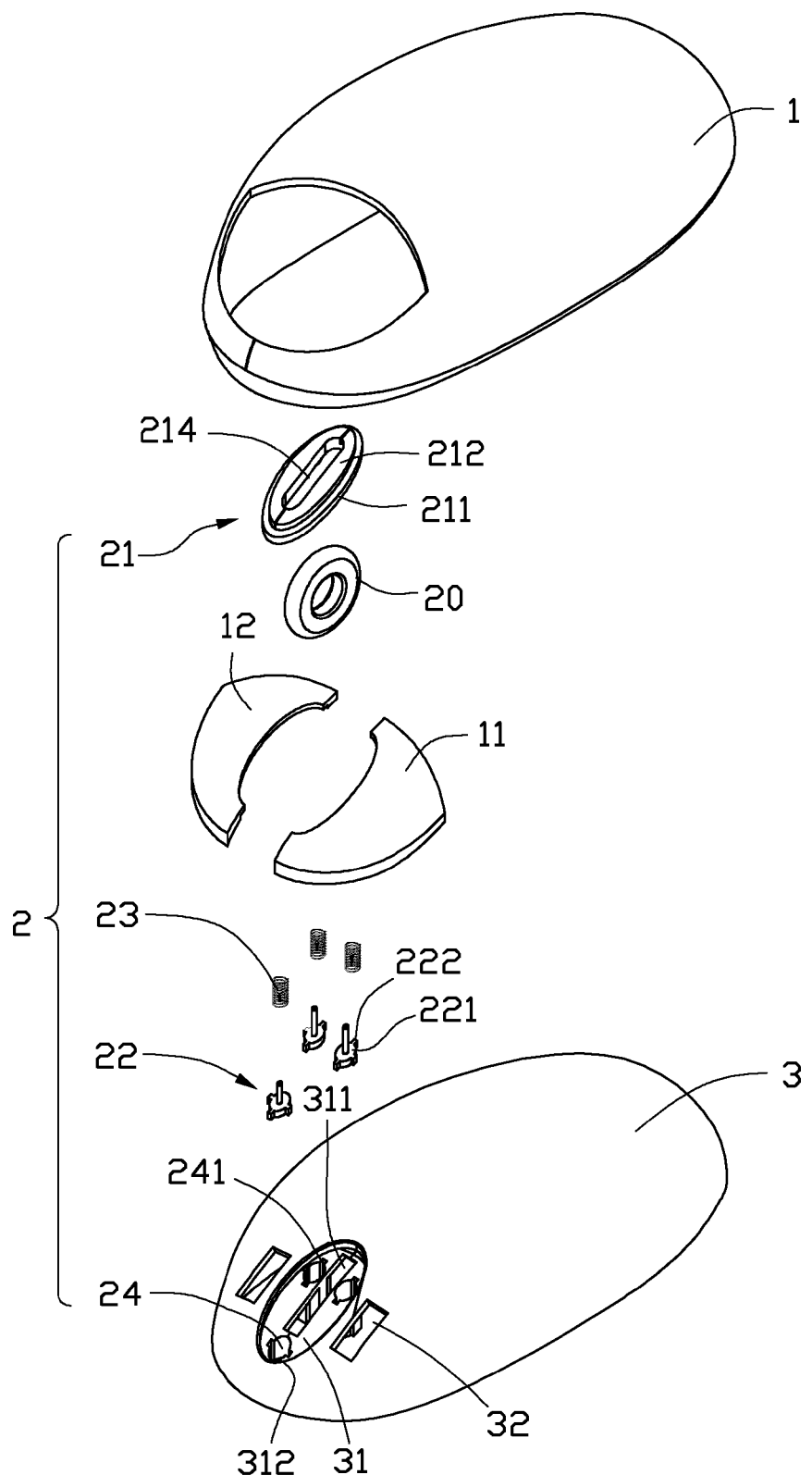
FIG. 2 is an exploded view of the computer mouse of FIG. 1.
Figure 3:
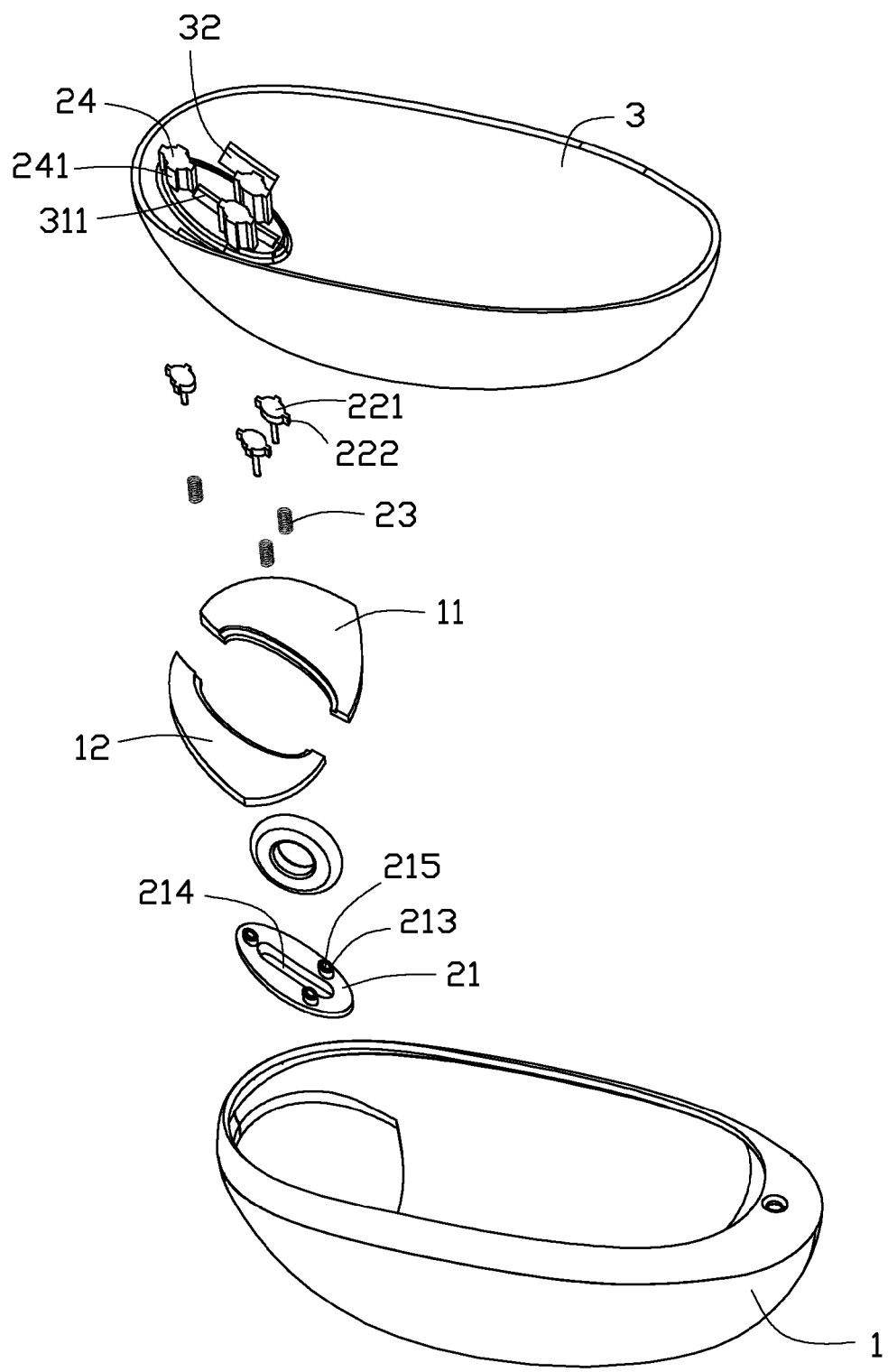
FIG. 3 is an exploded view of the computer mouse of FIG. 1, but showing the computer mouse inverted.
Figure 4:
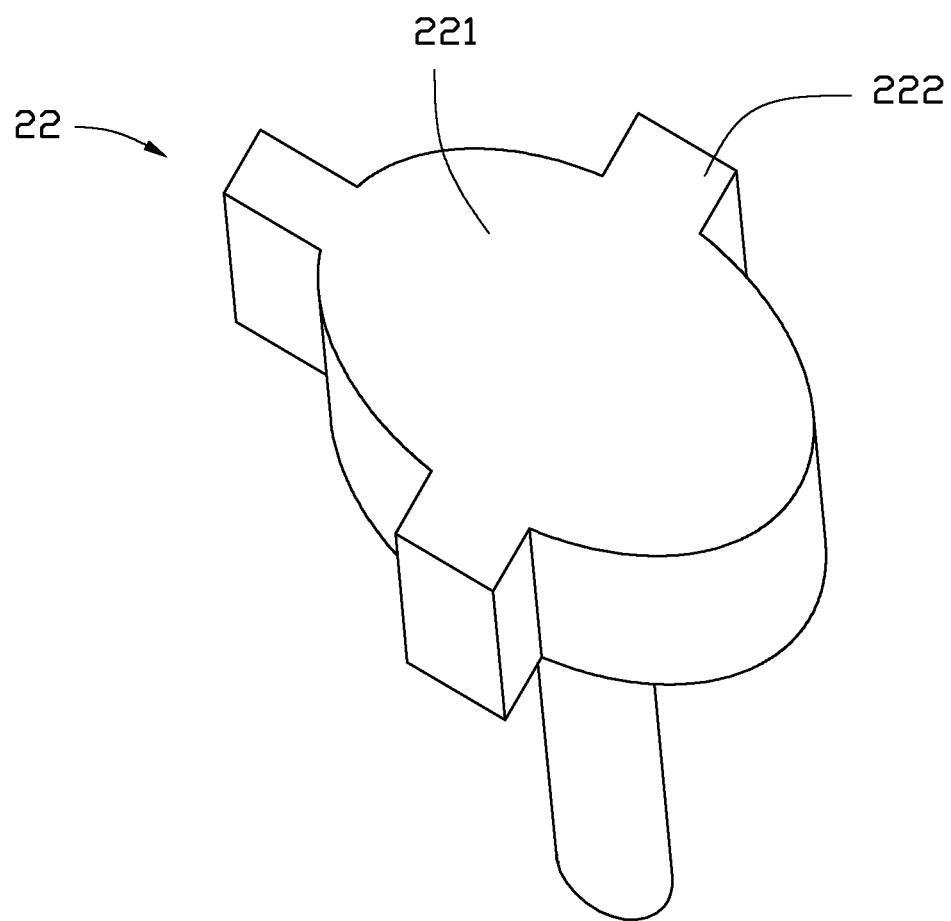
FIG. 4 is an enlarged view of a guide rod shown in FIG. 3.
Figure 5:
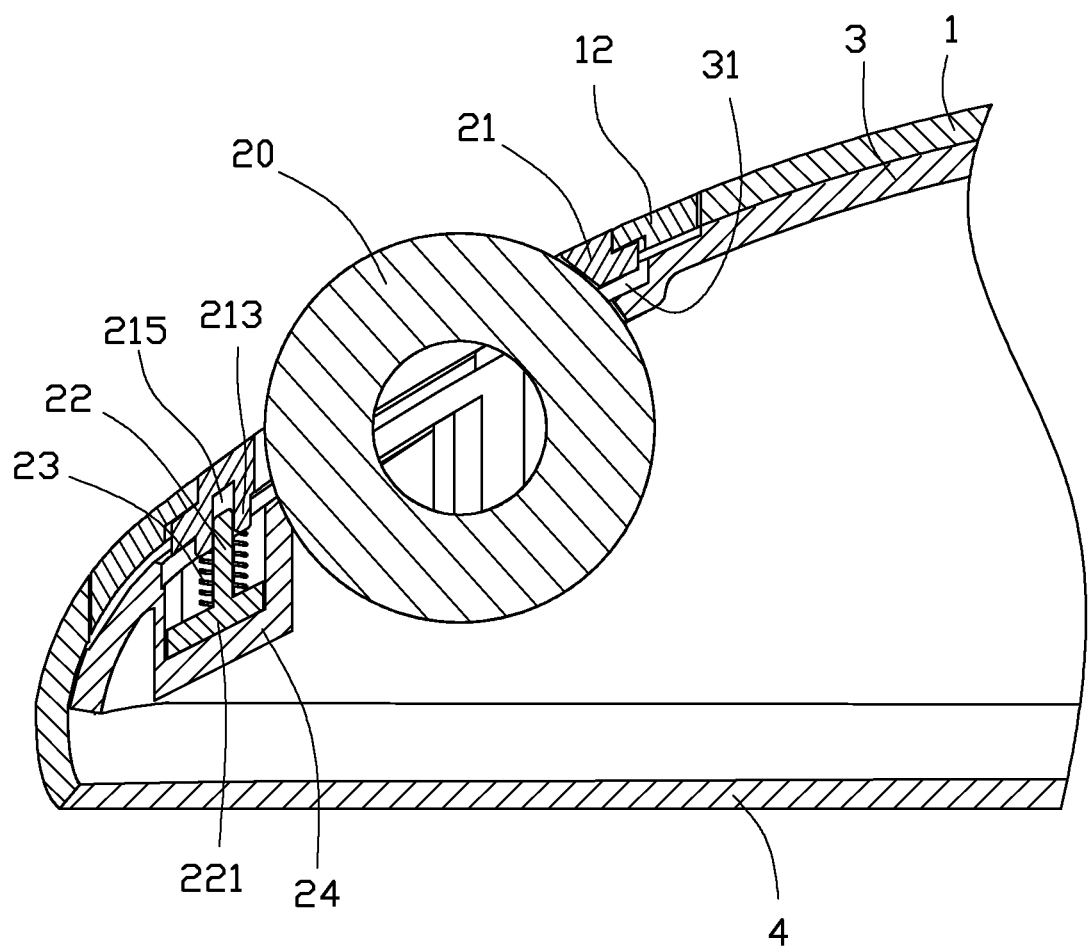
FIG. 5 is a cross-sectional view of part of the computer mouse of FIG. 1, taken along line V-V thereof

Referring to FIGS. 1-5, a computer mouse 100 includes an outer housing 1, a middle button bracket 2, an inner housing 3, and a bottom cover 4. A left button 11 and a right button 12 are mounted on the outer housing 1. A middle button hole 13 is cooperatively defined by and located between the left button 11 and the right button 12. A middle button 20 extends through the middle button hole 13 and protrudes from the outer housing 1 between the left and right buttons 11, 12. The middle button bracket 2 includes a dust-proof block 21, three guide rods 22, three elastic components 23, and three guide rod receiving portions 24. In the embodiment, the three elastic components 23 are coil springs 23.

The dust-proof block 21 includes a main body 211, a raised portion 212 protruding from an upper surface of the main body 211, three protrusions 213 protruding from a lower surface of the main body 211, and a middle button receiving slot 214 extending through the main body 211 and the raised portion 212. The middle button 20 is arranged in the middle button receiving hole 24. The three protrusions 213 are distributed around the middle button receiving slot 214. In the illustrated embodiment, the protrusions 213 are in the form of short posts. A blind hole 215 is defined in each of the three protrusions 213. In the embodiment, the main body 211 and the raised portion 212 are elliptical.

One end of each guide rod 22 is received in the blind hole 215 of a corresponding one of the three protrusions 213, and is spaced a distance away from an inmost top wall of the blind hole 215. The other end of each guide rod 22 connects with a shim 221. A number of bearing ribs 222 are defined on a peripheral sidewall of the shim 221. In the illustrated embodiment, there are three bearing ribs 222.

The inner housing 3 is located within the outer housing 1, and has an outer surface spaced apart from the inner surface of the outer housing 1. A recessed portion 31 is defined in the inner housing 3. A middle button through hole 311 and three guide holes 312 are defined in the bottom of the recessed portion 31. The three guide holes 312 are arranged around the middle button through hole 311. Two through holes 32 are defined in the inner housing 3 at opposite sides of the recessed portion 31. The left button 11 and the right button 12 each include a protruding post (not shown) extending through a corresponding one of the two through holes 32. When the left button 11 or the right button 12 is pressed, the relevant protruding post actuates a switch. Each guide rod receiving portion 24 includes an open end and a closed end, with the open end being in communication with a corresponding one of the guide holes 312 at the bottom of the recessed portion 31. Three positioning slots 241 are defined in an inner sidewall of the guide rod receiving portion 24, corresponding to the three bearing ribs 222 of a respective one of the shims 221.

In other embodiments, the number of the guide rods 22, coil springs 23, and guide rod receiving portions 24 can be varied according to need.

When assembling the computer mouse 100, the middle button 20 is arranged in the middle button receiving slot 214. The raised portion 212 fits in the middle button hole 13, and the top surface of the raised portion 212 is substantially flush with outer surfaces of the left button 11 and the right button 12. A peripheral sidewall of the raised portion 212 is in contact with or abuts a sidewall of the middle button hole 13. The upper surface of the main body 211 around the raised portion 212 abuts against inner surfaces of the left button 11 and the right button 12. The end of each guide rod 22 away from the shim 221 is received in a corresponding one of the blind holes 215, but is spaced a distance away from the inmost top wall of the blind hole 215, thereby allowing the dust-proof block 21 to slide up and down along the three guide rods 22. Each coil spring 23 is coiled around a corresponding one of the guide rods 22, with opposite ends abutting against the corresponding protrusion 213 and the corresponding shim 221. The coil spring 23 applies a pushing force to the block 21, such that the top surface of the raised portion 212 can be substantially flush with the outer surfaces of the left button 11 and the right button 12. The shim 221 abuts against the bottom of the closed end of the corresponding guide rod receiving portion 24. The bearing ribs 222 on the sidewall of the shim 221 are slidably received in the positioning slots 241 of the inner sidewall of the guide rod receiving portion 24. The lower surface of the dust-proof block 21 is spaced a distance away from the recessed portion 31.

In other embodiments, the inner housing 3 may be omitted. In such case, the closed ends of the guide rod receiving portions 24 may connect with the bottom cover 4. Further, the guide rod receiving portions 24 may be omitted. In such case, the shims 221 may be connected to the bottom cover 4. Further, the shims 221 may be omitted. In such case, the ends of the guide rods 22 away from the protrusions 213 may be directly connected to the bottom cover 4, and the bottom ends of the coil springs 23 away from the protrusions 213 may be also directly connected to the bottom cover 4. Further, the protrusions 213 may be omitted. In such case, the ends of the guide rods 22 away from the bottom cover 4 may be spaced a distance away from the lower surface of the main body 211; and opposite ends of the coil springs 23 may abut against the lower surface of the main body 211 and the bottom cover 4, respectively. Further, the guide rods 22 may be omitted.

When pressed, the left button 11 or the right button 12 moves down and pushes the dust-proof block 21 to move down along the guide rods 22. During the movement of the block 21, the coil springs 23 constantly push against the dust-proof block 21, keeping the top surface of the raised portion 212 substantially flush with the outer surface of the corresponding pressed left button 11 or right button 12. When the user releases the left button 11 or the right button 12, the coil springs 23 push the dust-proof block 21 back up, and the dust-proof block 21 pushes the corresponding pressed left button 11 or right button 12 back to its original position. When the left button 11 and the right button 12 are back in their initial resting positions, the top surface of the raised portion 212 is substantially flush with the outer surfaces of the left and right buttons 11, 12. Because the coil springs 23 continue to bias the dust-proof block 21, the top surface of the raised portion 212 is always substantially flush with the outer surfaces of the left button 11 and the right button 12 when neither button 11, 12 is pressed, and is substantially flush with the outer surface of the left or right button 11 or 12 when the left or right button 11 or 12 is pressed. In addition, the sidewall of the raised portion 212 is always in contact with or abuts the sidewall of the middle button hole 13. As a result, there are substantially no gaps between each of the left and right buttons 11, 12 and the middle button 20 in the computer mouse 100. Thereby, dust and contaminants are prevented from entering the computer mouse 100.

Although certain embodiments have been specifically described, the present disclosure is not to be construed as being limited thereto. Various changes or modifications may be made to the present embodiments without departing from the scope and spirit of the present disclosure.

What is claimed is:

1. A computer mouse comprising:
    an outer housing defining a receiving space;
    a left button and a right button received in the receiving space of the outer housing;
    a middle button hole cooperatively defined by and located between the left button and the right button;
    a middle button arranged in the middle button hole between the left button and the right button;
    a bottom cover connected to the outer housing; and
    a middle button bracket comprising:
        a dust-proof block comprising:
            a main body comprising an upper surface;
            a raised portion protruding from the upper surface of the main body; and
            a middle button receiving slot extending through the main body and the raised portion, the middle button being arranged in the middle button receiving slot, the raised portion being fitted in the middle button hole, a top surface of the raised portion being substantially flush with outer surfaces of the left button and the right button, and a sidewall of the raised portion being in contact with a sidewall of the middle button hole; and
        a plurality of elastic components arranged between the main body and the bottom cover, a first end of each of the elastic components abutting against a lower surface of the main body, and the elastic components applying a pushing force to the dust-proof block, thereby keeping the top surface of the raised portion substantially flush with the outer surfaces of the left button and the right button when no button being pressed and substantially flush with the outer surface of the left button or the right button when the left button or the right button is pressed.

2. The computer mouse of claim 1, wherein the elastic components are coil springs.

3. The computer mouse of claim 2, wherein the middle button bracket further comprises a plurality of guide rods, a first end of each of the guide rods is spaced a distance away from a lower surface of the main body of the dust-proof block, a second end of each of the guide rods is connected to the bottom cover, each of the coil springs is coiled around one of the guide rods, a first end of each of the coil springs abuts against the lower surface of the main body of the dust-proof block, and a second end of each of the coil springs abuts against the bottom cover.

4. The computer mouse of claim 3, wherein a plurality of protrusions protrude down from the lower surface of the main body, a blind hole is defined in each of the protrusions, and the first end of each of the guide rods is received in the blind hole of a corresponding one of the protrusions and spaced a distance away from an inmost top wall of the blind hole.

5. The computer mouse of claim 4, wherein the second end of each of the guide rods is connected with a shim, the shim is connected to the bottom cover, and the second end of the corresponding coil spring abuts against the shim.

6. The computer mouse of claim 5, wherein the middle button bracket further comprises a plurality of guide rod receiving portions each comprising an open end and a closed end, the closed end of each of the guide rod receiving portions is connected to the bottom cover, each of the guide rod receiving portions receives a respective guide rod and the corresponding coil spring coiled around the guide rod, and the shim connected to the second end of the guide rod abuts against a bottom of the closed end of the guide rod receiving portion.

7. The computer mouse of claim 6, further comprising an inner housing located within the outer housing, wherein the inner housing defines a recessed portion, a plurality of guide holes and a middle button through hole defined in the bottom of the recessed portion, and the open end of each of the plurality of guide rod receiving portions being in communication with one of the plurality of guide holes.

8. The computer mouse of claim 7, wherein a plurality of bearing ribs are defined on a sidewall of each of the shims, a plurality of positioning slots are defined in an inner sidewall of each of the guide rod receiving portions, and the bearing ribs of each shim are slidably received in the positioning slots of the corresponding guide rod receiving portion.

9. The computer mouse of claim 8, wherein the plurality of protrusions comprises three protrusions, the plurality of guide rods comprises three guide rods, the plurality of coil springs comprises three coil springs, the plurality of shims comprises three shims, and the plurality of guide rod receiving portions comprises three guide rod receiving portions.

10. The computer mouse of claim 1, wherein the main body and the raised portion are elliptic.

11. The computer mouse of claim 1, wherein when each of the left button and the right button is pressed, the dust-proof block descends in unison with the corresponding pressed left button or right button.

12. A computer mouse comprising:
    an outer housing defining a receiving space;
    a left button and a right button received in the receiving space of the outer housing;
    a middle button hole cooperatively defined by and located between the left button and the right button;
    a middle button arranged in the middle button hole between the left button and the right button;
    a bottom cover connected to the outer housing; and
    a middle button bracket comprising:

a dust-proof block comprising:
  a main body comprising an upper surface;
  a raised portion protruding from the upper surface of the main body; and
  a middle button receiving slot extending through the main body and the raised portion, the middle button being arranged in the middle button receiving slot, the raised portion being fitted in the middle button hole, a top surface of the raised portion being substantially flush with outer surfaces of the left button and the right button, and a sidewall of the raised portion abutting a sidewall of the middle button hole; and
a plurality of elastic components arranged between the main body and the bottom cover, a first end of each of the elastic components abutting against a lower surface of the main body, and the elastic components urging the dust-proof block, thereby keeping the top surface of the raised portion substantially flush with the outer surfaces of the left button and the right button when neither the left button nor the right button is pressed, and substantially flush with the outer surface of the left button or the right button when the left button or the right button is pressed.

* * * * *